Oct. 13, 1953 — P. W. GARBO — 2,655,437
FLUIDIZED SOLIDS REACTOR
Filed June 2, 1950

INVENTOR.
PAUL W. GARBO
BY
ATTORNEYS

Patented Oct. 13, 1953

2,655,437

UNITED STATES PATENT OFFICE 2,655,437

FLUIDIZED SOLIDS REACTOR

Paul W. Garbo, Freeport, N. Y., assignor to Hydrocarbon Research, Inc., New York, N. Y., a corporation of New Jersey Application June 2, 1950, Serial No. 165,810

2 Claims. (Cl. 23—288)

The present invention concerns contacting a gasiform reactant stream with a dense phase, fluidized, solid particle material in the form of a powder or the like for effecting a reaction involving a substantial thermal effect, and relates more particularly to a reactor effective to maintain more uniform contact between the gasiform reactant and the fluidized solid particles without the irregularities hithertofore encountered.

In particular, the present invention contemplates uniform interassociation of the gaseous reactant with the dense fluid solid particle phase, in a reaction space through which the gases pass vertically, confined solely by uninterrupted, vertical wall surfaces subject to temperature control.

To this end, the invention involves a reaction chamber having side walls which are vertical and substantially uninterrupted, and a lower boundary or extremity defined by a temperature-regulated tube sheet disposed throughout at a substantial angle of inclination with respect to the horizontal which is at least equal to the angle of repose of the solid particle material constituting the fluid phase.

A plurality of spaced, parallel temperature-controlling tubes extend vertically from the inclined bottom tube sheet, through the reaction chamber, surrounded by the dense fluid phase of solid particles therein.

The space below the inclined tube sheet is enclosed to form a lower chamber for a temperature-regulating fluid. The temperature-regulating tubes extend through the tube sheet to communicate interiorly with the lower reservoir or chamber, while a second tube sheet receives the upper extremities of the tubes and cooperates with a chamber or reservoir thereabove for receiving effluent temperature-regulating fluid.

As a result, both tube sheets and the vertical tubes are subjected to continuous temperature control by the heating or coolant fluid as the case may be.

The gasiform reactant inlet to the reaction chamber is disposed above the lower tube sheet in the vicinity of its lowermost elevation and, therefore, permits upward flow of gas across the inclined surface thereof to distribute uniformly across the horizontal section of the reaction zone prior to flowing upwardly an appreciable distance.

As a result, the incoming reactant stream becomes thoroughly distributed throughout the fluid phase mass, completely across the lowermost section of the reaction zone and thereafter proceeds upwardly therethrough between uninterrupted, vertical, confining walls.

The reaction products are thence withdrawn from the pseudo-liquid upper surface of the catalyst phase and passed from the vessel through an outlet thereabove.

The present invention is of particular advantage in enabling complete realization of the full advantages of fluid phase operation in the ideal state of uniformity throughout the reaction zone.

It has heretofore been recognized that the fluid phase technique of contacting reactant gas with solid particle materials offers several advantages from the standpoint of temperature control, as well as general uniformity of reaction throughout the reaction zone. This is particularly advantageous, in processes such as the catalytic synthesis of hydrocarbons from a mixture of hydrogen and carbon monoxide, where it is important that the reaction be carried out under careful control, within narrow limits of temperature. For the same and other reasons, it constitutes an important technique in connection with this and similar processes where it is important that the reaction go forward equally throughout the reaction zone.

It has been recognized, however, that a dense fluid phase of solid particles, supported by the upflowing stream of reactants, is subject to considerable variation with changes in the rate, kind and direction of gas flow. Such changes in flow are inherent in the type of internal cooling exchangers heretofore employed, as well as in the failure to effect uniform distribution of the feed gas at the bottom of the reaction zone under close temperature regulation. As a result, the character of the fluid phase varies widely and frequently for a considerable distance of irregularity, resulting in so-called "dead spots" with zones of high activity and areas of low or uncontrolled activity. Excessive localized reaction manifestly tends to exceed the design limitations and as a result, in all the areas, undesired side reactions tend to occur.

Where efforts have been made to promote uninterrupted vertical flow in the main section of the reactor, failure to effect uniform distribution of the reactant gas across the lower inlet section under close temperature control has resulted in an analogous, undesired condition of heterogeneity of the catalyst phase in this area, which results in excessive localized variation in reaction conditions which can seriously affect the subsequent course of the reaction.

In order to describe the invention in greater detail, reference is had to the attached drawing, wherein—

Figure 1:
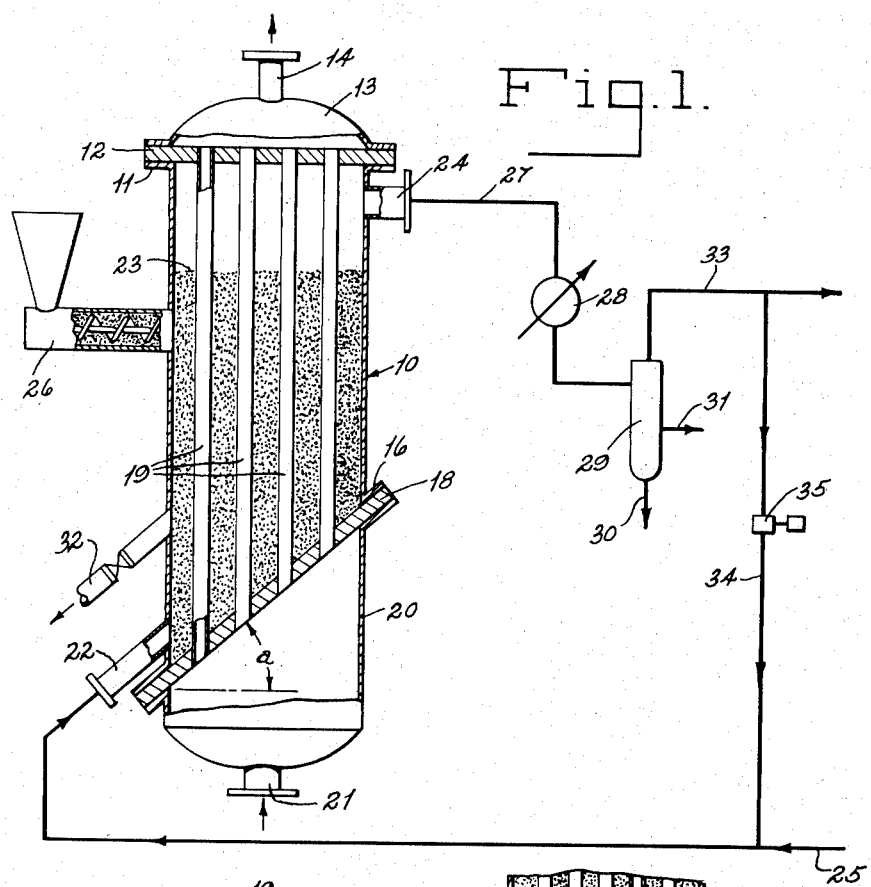
Figure 1 is a vertical section, taken centrally through a reactor embodying the present invention, associated with flow diagram exemplifying operation in connection with the catalytic synthesis of hydrocarbons.

Referring to Figure 1, the reactor comprises an upstanding tubular wall 10, which extends vertically and terminates at its upper extremity in a flange 11 supporting an upper tube sheet 12. Above the tube sheet 12, a dome or housing 13 provides an upper reservoir having an outlet 14.

The lower extremity of the tubular member 10 is provided with a flange 16, located in an inclined plane, making a substantial angle with the horizontal. To the flange 16 is attached an inclined lower tube sheet 18. A plurality of spaced, parallel, vertically-extending tubes 19 extend between the tube sheets 12 and 18 respectively.

To the underside of the lower tube sheet 18 is attached a chamber or vessel 20 forming a lower reservoir, communicating with the interior of the tubes 19, and in turn, with the upper reservoir to receive cooling or heating fluid which may be introduced through inlet connection 21.

In short, a heat exchange fluid such as water, Dowtherm, steam or the like is introduced through connection 21 into chamber 20 to feed the tubes 19, as desired. Effluent fluid or the vapors thereof, as may be, pass thereafter into the upper chamber 13, and from there, into withdrawal connection 14. If desired, the flow may be reversed, introducing the heat exchange fluid through connector 14 and withdrawing it at point 21.

From the foregoing, it will be apparent that the interior of the tubular reaction chamber 10, above the lower tube plate 18 and within the space defined by the inner surface of the chamber walls and the outer surface of the tubes 19, forms a vertical-walled reaction zone for accommodating a dense fluid phase mass of solid reaction particles such as an iron type, hydrocarbon synthesis catalyst.

The inlet connection 22 for the reactant stream of gas is located in the lowermost portion of the side wall of vessel 10, just above tube plate 18 and in the vicinity of its point of lowest elevation.

As above indicated, the lower confining wall of the reaction zone, namely, the tube sheet 18, is disposed at an angle with the horizontal which is at least equal to the angle of repose of the solid particle material in the reaction zone. This is critical from the standpoint of permitting free lateral flow of gas through the solid particle phase. As a result, the incoming reactant stream passes freely across the lower transverse section of the reactor, above the sheet 18, uniformly distributing itself, while under close temperature control, and thence passing upwardly through the uninterrupted vertical-called passageways above. At the upper, pseudo-liquid level 23 of the catalyst phase, the gasiform effluent stream separates from the solid particle phase and moves through the outlet connection 24. Therefore, fluidization prevails throughout each and every section of the reaction zone.

For example, a synthesis gas comprising essentially hydrogen and carbon monoxide, introduced from any suitable source not shown, through pipe 25, is passed to inlet connection 22, mingles uniformly with the fluidized, solid particle, synthesis catalyst in dense phase condition at a reaction temperature of approximately 650° F. and a pressure of about 400 p. s. i. g. to produce essentially liquid hydrocarbons in the motor gasoline boiling range. The effluent products are withdrawn through line 27 to condenser 28 and separator 29. Aqueous condensate is recovered via line 30, and product oil through line 31. The normally gaseous fraction moves overhead through line 33 and is in part discharged, as indicated, the remainder being recycled to inlet pipe 25 via recycle line 34 and compressor 35.

The improved uniformity of contact in the reaction vessel is reflected in the materially decreased yield of undesired gaseous hydrocarbons and carbon dioxide, the lessened formation of carbon upon the catalyst in the reaction zone and the substantially invariable temperature prevailing throughout the fluidized catalyst mass. In spite of high reactant gas concentration across the lower section of the reaction zone, the reactor of this invention provides adequate cooling through the lower tube sheet 18 and the lower portions of the tubes 19.

In any reactor embodying the principles of the present invention, it is desirable to provide means for introducing the material of the solid particle phase and for withdrawing residual particles. Therefore, the reactor is provided, at a relatively high point, with a solid particle feeding means 26 comprising a feed hopper and a suitable transport mechanism extending into the reactor. The used particles are withdrawn through draw-off means 32, which may comprise a conduit controlled by a slide valve.

By this means, used catalyst may periodically or continuously be drawn off and replaced by fresh or regenerated catalyst. So also, in a coal carbonization system, the carbonized particles or ash may be withdrawn as a fresh charge of solids is admitted.

Figures 2, 3:
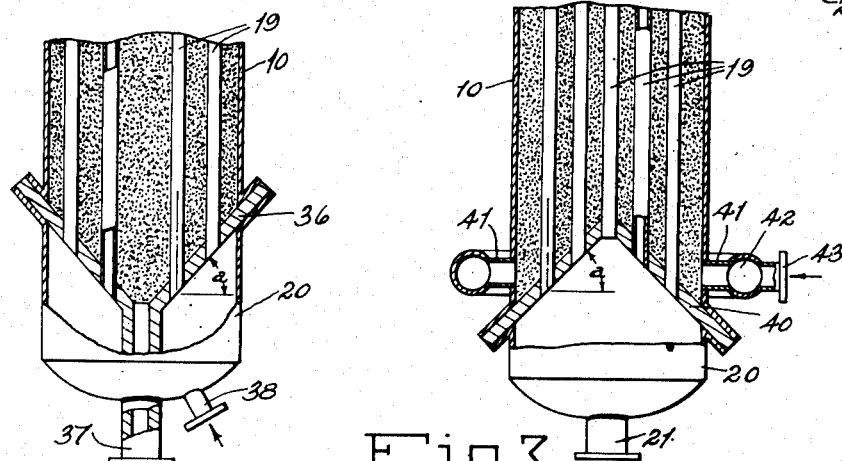
Figures 2 and 3 are fragmentary elevations, partly in section, disclosing alternative forms of reactor construction.

The embodiments disclosed in Figures 2 and 3 disclose particularly advantageous modifications employing a lower tube sheet of frustoconical form. Actually, this structure is greatly superior to that disclosed in Figure 1 from the standpoint of the relative ease with which the incoming gas distributes itself laterally along the upper surface of the tube plate. Presumably, it follows from the fact that with a frustoconical lower tube sheet, the lateral feed gas distribution required to supply the entire reactor cross-section is less than half the diameter of the reactor, as contrasted with Figure 1, wherein the gas must move across the entire lateral dimension of the reactor. In any event, the resulting advantages constitute this the preferred embodiment.

With more particular regard to Figure 2, the frustoconical tube sheet 36 is disposed with its apex downwardly, in the vicinity of which the feed gas is introduced.

As in Figure 1, all portions of the tube sheet 36 make an angle $a$ with the horizontal which, as previously shown, equals at least the angle of repose of the solid particle powder in the reaction zone above. The reactant gas introduced through inlet connection 37 enters the reaction zone at the lower extremity of the frustoconical tube sheet. The heat exchange fluid enters or is withdrawn, as the case may be, from the lower reservoir or housing 20 via connection 38.

Therefore, the reactant stream meeting the fluid phase catalyst in the reaction zone moves laterally along the inclined, relatively cool, frustoconical surface distributing uniformly across the lower section of the reactor, and thereafter moving vertically through the catalyst at a temperature uniformly controlled by indirect heat exchange with the coolant in tubes 19.

The embodiment in Figure 3 includes conical tube sheet 40 with its apex at the top and on the central axis of the reaction zone. Accordingly, the stream of reactant gas is, in this case, introduced above the tube sheet and about the marginal periphery thereof, through spaced inlets 41 supplied through bustle tube 42 by inlet 43. Therefore, the inlets, as before, are disposed in the vicinity of the lowermost portions of the tube sheet 40.

The present invention is applicable, not only to catalytic gas phase reactions, such as catalytic hydrogenation, oxidation, hydrocarbon conversion and the like, but as above intimated, is useful where the solid particles of the fluid phase comprise a reactant material, such as, for example, in the carbonization or gasification of coal, oil shale, lignite and similar carbonaceous materials.

Manifestly, the heat exchange fluid may function either as a coolant or as a heat-supplying material depending upon whether the reaction contemplated is exothermic or endothermic in character.

In all instances, the improved uniformity of contact is important as regards realizing the desired uniformity of reaction and temperature regulation necessary to avoid uncontrolled and undesirable side reactions which impair the yield and quality of the reaction products.

Obviously, many modifications and variations of the invention, as hereinbefore set forth, may be made without departing from the spirit and scope thereof, and therefore only such limitations should be imposed as are indicated in the appended claims.

I claim:

1. In a reactor for contacting a gasiform reactant stream with a dense fluid phase, solid particle material, a vertical reaction vessel divided by upper and lower tube sheets into a lower temperature-regulating fluid reservoir, a central reaction chamber and an upper temperature-regulating fluid reservoir, a plurality of parallel, vertical tubes passing through said central reaction chamber from the lower tube sheet to the upper tube sheet and communicating with said reservoirs, the upper tube sheet being disposed in a horizontal plane at right angles to said vertical tubes, the lower tube sheet forming a substantial angle with the horizontal equal at least to the angle of repose of the solid particle material, means for introducing the gasiform reactant stream into the reaction chamber just above the lower tube sheet substantially uniformly substantially along its lowest elevation within the vessel without passing through said lower tube sheet, means for withdrawing effluent reaction products from the upper portion of said reaction chamber below the upper tube sheet and without passing through said upper tube sheet, means for supplying temperature-regulating fluid to one of said reservoirs to circulate through said vertical tubes, means for removing said fluid from the other of said reservoirs and means for introducing said solid particle material and withdrawing it from said central reaction chamber without passing through said tube sheets.

2. A reactor for conducting reactions having a substantial thermal effect and involving contact between a gasiform reactant stream and a fluidized, solid particle material, comprising a vertically disposed, cylindrical housing to contain said fluidized, solid particle material, upper and lower tube sheets extending across the upper and lower extremities of said cylindrical housing, respectively, a plurality of tubes extending vertically between said upper and lower tube sheets through said cylindrical housing in spaced, parallel relationship, said upper tube sheet residing in a horizontal plane at right angles to said vertical tubes, said lower tube sheet being of conical shape with its axis disposed vertically and the wall thereof being disposed at a substantial angle with respect to the horizontal at least equal to the angle of repose of said solid particle material, headers above and below said upper and lower tube sheets, respectively, forming upper and lower reservoirs communicating with the interior of said vertical tubes, said headers being attached to the respective tube sheets, a port in each of said headers for the flow of temperature controlling fluid therethrough, means for introducing said gasiform reactant stream into said cylindrical housing above said lower tube sheet in the vicinity of the lowermost portion thereof and for distributing said gasiform reactant stream substantially uniformly along the upper surface of said lower tube sheet and without passing through said lower tube sheet, means for withdrawing effluent reaction products from the upper portion of said cylindrical housing below said upper tube sheet and without passing through said upper tube sheet, and means for introducing said solid particle material into and withdrawing it from said cylindrical housing without passing through said tube sheets.

PAUL W. GARBO.

References Cited in the file of this patent

UNITED STATES PATENTS

| Number | Name | Date |
|---|---|---|
| 1,303,088 | McCaig et al. | May 6, 1919 |
| 1,884,777 | Lucke | Oct. 25, 1932 |
| 2,412,025 | Zimmerman | Dec. 3, 1946 |
| 2,418,837 | Houdry | Apr. 15, 1947 |
| 2,432,543 | Prickett et al. | Dec. 16, 1947 |
| 2,472,377 | Keith | June 7, 1949 |